Figure 1:
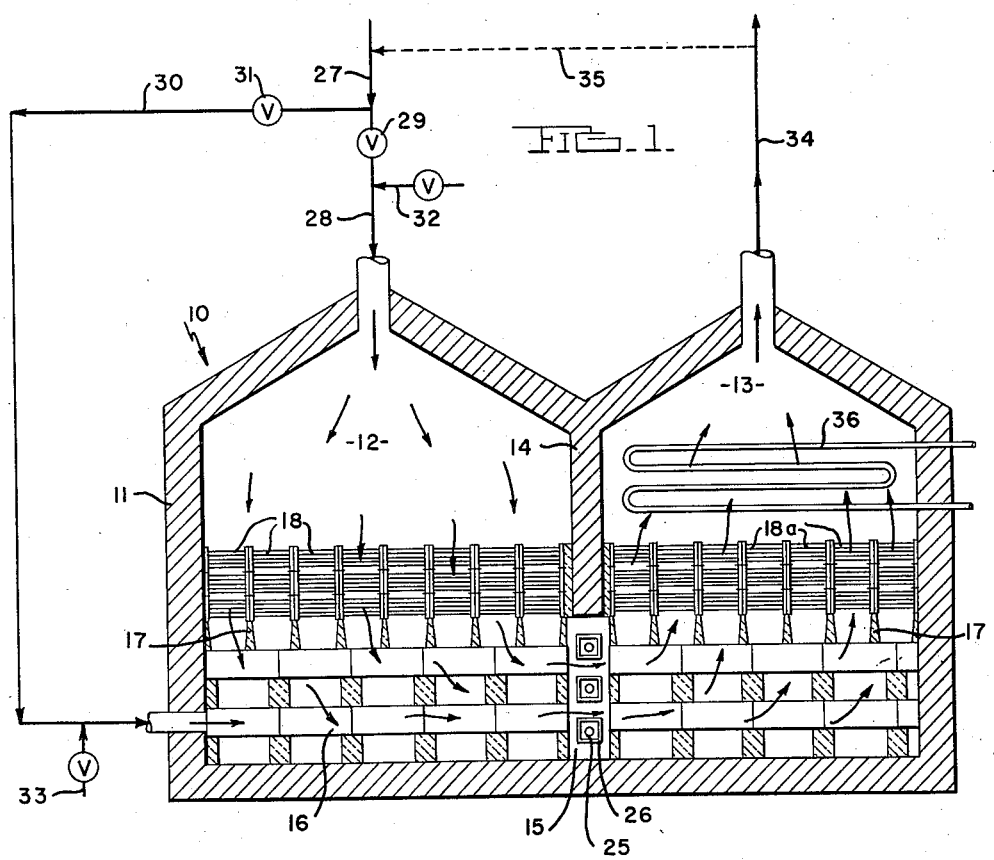

INVENTOR.
EUGENE J. HOUDRY
CLETUS T. HAYES
BY
ATTORNEY

2,905,523

METHOD FOR THE ELIMINATION OF FINELY DIVIDED CARBONACEOUS MATERIAL FROM GAS STREAMS

Eugene J. Houdry, Ardmore, and Cletus T. Hayes, Philadelphia, Pa., assignors to Oxy-Catalyst, Inc., a corporation of Pennsylvania Application December 19, 1955, Serial No. 553,943

5 Claims. (Cl. 23—2)

This invention is concerned with the treatment of gas streams containing entrained, finely divided carbonaceous solids together with combustible gases such as carbon monoxide and gaseous hydrocarbons for the purpose of oxidizing and thus effecting substantially complete elimination of the entrained solids.

In the operation of some industrial processes, such as in the production of carbon black by the partial oxidation of hydrocarbons, a tail gas or effluent is produced which, in addition to substantial quantities of combustible gases such as hydrogen, carbon monoxide and gaseous hydrocarbons, contains quantities of entrained carbonaceous solids. Often, the removal of these carbonaceous solids by mechanical means such as cyclones, bag filters, or even electrostatic precipitators, is difficult because of their extremely small size. In the production of carbon black, for example, carbon black particles in sizes ranging from 5 microns down to sub-micron size will escape the cyclones, bag filters and even electrostatic precipitators in the solids disentrainment system. Often these small particles will comprise one or two percent of the total carbon black production and represent a serious air pollution problem if permitted to be discharged to the atmosphere.

Similarly, in a newly developed process for the coking of residual oils in a circulating fluidized bed an effluent is produced containing fine particles of coke ranging from sub-micron size to 10 microns in size after the cyclone separators as well as combustible gases principally in the form of carbon monoxide. In this fluidized coking operation, a pair of fluidized beds are maintained in separate vessels. In one fluidized bed the bed is blown with an oxygen-containing gas to cause partial combustion of the coke particles and thus raise the temperature of the bed. The hot particles from this bed are then transferred to the second vessel where they are sprayed with residual oil with resulting thermal cracking and coking on the surface of the hot particles. The particles with an additional deposit of coke are then recycled again to the first vessel where partial combustion and re-heating of the particles is once more effected. The effluent from this operation, after passing the cyclone separators, may contain e.g. .05% to .5% by weight of entrained coke particles ranging in size from sub-micron to 10 microns, and combustible gases including principally carbon monoxide in concentrations of from 3 to 8% for example.

Up to the present time, there has been no practical method for the elimination of these suspended carbonaceous solids. While the gas stream in which they are entrained may contain substantial quantities of combustible gases, these gases are not ordinarily flammable at ordinary temperatures because of insufficient concentration of combustible gases, large quantities of diluting water vapor or other reasons. In order to burn such mixtures by flame combustion, it is necessary to preheat the mixture to elevated temperatures such as 1200° F. to 1500° F., requiring the consumption of large amounts of heat energy. Although it is possible to recover some of the heat in the stream after combustion by waste heat boilers and the like, the final gas temperature achieved during the operation is often not sufficiently high to permit efficient boiler operation. Furthermore, often there is no use for the large quantities of waste heat produced and consequently this method usually results in prohibitively high operating costs. While it is possible to catalytically oxidize the combustible gases contained in these streams at lower temperatures, simultaneous oxidation of the suspended carbon particles does not occur effectively within the temperature limits at which oxidation catalysts must operate. Even with the use of high temperation oxidation catalysts, such as a platinum-on-alumina type catalyst, the maximum permissible operating temperature of the catalyst is of the order of only 1600° F. and if this temperature is exceeded, the activity of the catalyst rapidly declines. Even at temperatures as high as 1600° F. however, only partial oxidation of the entrained solid carbonaceous material will occur, leaving substantial quantities of the solids in the effluent discharged to the atmosphere.

According to the present invention it has been found that an economical and effective method for the substantially complete elimination of the finely-divided suspended carbonaceous material in such streams may be provided by catalytically oxidizing the combustible gases in the stream in the presence of an oxidation catalyst which has a relatively high maximum operating temperature, preferably of the order of from 1200° F. to 1600° F., so as thus to elevate the temperature of the stream by means of the heat released during the catalytic oxidation operation. Depending upon the combustibles content of the stream and its initial temperature, the temperature of the stream may be raised in this manner as high as but not in excess of the maximum operating temperature of the catalyst with the use of little or no outside heat. Following this, the hot effluent from the catalyst is then heated out of contact with the catalyst to a higher temperature, such as from 1800° F. to 2200° F., preferably by direct addition of hot combustion products, at which temperatures effective oxidation of the suspended carbonaceous material occurs. In accordance with the preferred embodiment of the invention the gas stream after or concurrently with such additional heating is passed in contact with ceramic surfaces in the form of checker-brickwork or similar arrangements providing a relatively large area of hot surfaces with which the gas stream is brought into close contact. If desired a heat exchanger in the form of a waste heat boiler for example may be provided to recover a portion of the heat released during the catalytic oxidation operation and which is added to the stream thereafter.

Where the stream is quite rich in combustible gases, although difficult or impossible to burn by flame combustion at relatively low temperatures, it will sometimes prove desirable to pass only a portion of the stream through the oxidation catalyst and to mix the remaining unoxidized portion with the hot effluent from the catalyst simultaneously with the addition of more heat from outside sources to bring the temperature of the mixture to the point at which both the unoxidized portion will oxidize out of contact with the catalyst and at which the entrained carbonaceous solids will undergo substantially complete oxidation.

Figures 2, 3, 4:
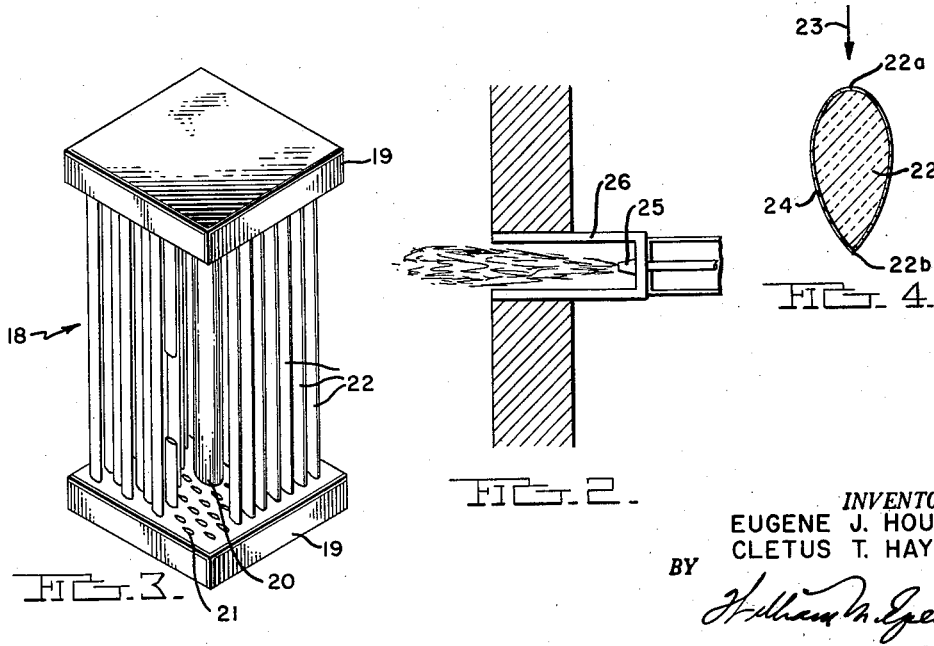

For a better understanding of the invention, reference is now made to the accompanying drawings in which:

Fig. 1 is a semi-diagrammatic illustration of one form of apparatus suitable for carrying out the process of the invention; and, Fig. 2 is a cross-sectional view of a recessed burner unit used in the apparatus shown in Fig. 1; and, Fig. 3 is an illustration in perspective of a catalytic unit of the type which may be used in the process of the invention; and, Fig. 4 is a cross-sectional view of one of the elements used in the catalytical unit of Fig. 3.

Referring now to Fig. 1, the reference numeral 10 generally designates a chamber formed of or lined with a high temperature material 11, such as high temperature firebrick. The chamber 10 is in turn divided internally into two chambers 12 and 13 by means of a common wall 14. The two chambers 12 and 13 communicate with one another by means of a passage or passages 15 formed in the lower portion of the common wall 14 so as to permit gases to flow from one chamber to another as indicated by the arrows.

In the lower portion of each of chambers 12 and 13 a checker-brickwork assembly 16 is provided which is of the open flue type, that is, so arranged that it is permeable to the passage of gases simultaneously both in horizontal and vertical directions.

In chamber 12, an assembly of catalytic units provided with a coating of catalytic material and each designated generally by the reference numeral 18 is provided, the units 18 being arranged in a number of layers, with the units in each layer stacked in side-by-side relation in a plurality of rows. The lower layer of units 18 is supported upon wedge-shaped supporting pillars 17 which in turn rest upon the upper layer of the checker-brickwork assembly 16. In the chamber 13, a plurality of units 18a which are similar in configuration to units 18, but which are not provided with a catalytic coating are similarly arranged.

Referring now to Fig. 3, which shows one of the catalytic units 18 in an enlarged perspective, it may be seen that this unit consists of a pair of rectangular end plates 19 which are fastened to a center post 20, the post 20 being preferably cemented in sockets provided in the central portion of each of the end plates 19. The end plates 19 are each provided with a plurality of apertures 21 which receive a plurality of elongated elements 22. As may be seen, the elements 22 are arranged in spaced apart relationship in a number of rows, the elements in each row being disposed in staggered relationship with respect to elements in adjacent rows to improve gas-to-surface contact. Fig. 4 shows the preferred cross-sectional configuration for the elements 22, namely an air-foil section having a rounded leading edge 22a and a tapered trailing edge 22b, the direction of gas flow being shown by an arrow 23. Such a configuration for the elements 22 decreases turbulence and thus reduces pressure drop in the gases flowing through the units 18.

The units 18 are preferably composed of heat resistant material, a high quality heat resistant porcelain being particularly desirable. The surfaces of the rod-like elements 22 are provided with a catalytic film designated by the reference numeral 24 (Fig. 4). This film is preferably very thin, having a thickness most desirably of the order of from .001" to .006" and may be composed of a film of activated alumina, activated beryllia, thoria, magnesia, zirconia or similar activated oxide impregnated with a small amount of a catalytically active metal such as platinum or palladium to provide an oxidation catalyst of high activity and chemical and physical stability. Particularly desirable results have been obtained by the use of a film of activated alumina .003" in thickness impregnated with from .5% to 1% by weight of platinum based on the weight of the alumina film.

When thus provided with a catalytic surface, the units 18 are ideally suited for use in accordance with the invention as an oxidation catalyst for catalytically oxidizing the combustible gases in the stream to be treated. However, it is to be understood that the invention is not limited to any particular configuration of catalyst nor to any particular chemical type of oxidation catalyst, the type of catalyst described above being merely illustrative of a particularly preferred and practicable type of catalyst for use in the process of the invention.

For a more complete description of the unit 18 itself, reference is made to my U.S. patent application Ser. No. 159,191, filed May 1, 1950, now Patent No. 2,730,434. For a more complete description of a preferred manner of assembling these units to provide a bed of catalyst as illustrated in the drawing, reference is made to U.S. Patent No. 2,718,460.

In chamber 13 the units 18a are identical in every respect to the units 18 with the exception that the catalytic film 24 is omitted such that this assembly of the units merely provides a large area of closely spaced ceramic surfaces over which the gases must flow to help promote the oxidation of the entrained carbonaceous solids at the higher temperatures prevailing in chamber 13.

In the walls of the passage 15 between chambers 12 and 13, a plurality of burners 25 are provided arranged in recessed enclosures 26 for the purpose of increasing the temperature of the gases flowing from chamber 12 to chamber 13.

If desired means may be provided for recovering heat from the hot effluent leaving units 18a. Such means may take the form, for example, of a waste heat boiler diagrammatically represented by the coil 36 disposed in the upper portion of chamber 13. Other or further means of recovering heat from the effluent gases may also be provided as will be apparent to those skilled in the art.

Process gases containing entrained carbonaceous solids together with combustible gases are introduced by line 27. The entire stream may flow into the top of chamber 12 through line 28 controlled by valve 29, or the stream may be split into two portions, one portion flowing into the top of chamber 12 by line 28 and the other portion flowing by line 30 controlled by valve 31 into the checker-brickwork assembly at the bottom of chamber 12 as shown. Valved line 32 is provided for the introduction of air when necessary into line 28, while valved line 33 is provided for the introduction of air when necessary into line 30. The treated gas stream, substantially free from entrained carbonaceous solids flows from the top of chamber 13 through stack 34.

In cases where the concentration of combustible gases in the stream to be treated and/or the temperature at which the stream is available are such that the temperature increase which the stream undergoes upon catalytic oxidation of the combustible components results in a catalyst bed temperature not greater than the maximum operating temperature of the catalyst, it will often prove most desirable to pass the entire stream through the bed of catalyst. In such case, the valve 31 would be entirely closed such that the entire stream would flow by line 28 into chamber 12 through the bed of catalytic units 18 where, by catalytic oxidation of the combustible components in the stream with accompanying release of heat, the temperature of the stream is raised to levels within the operating range of the catalyst such as from 1200° F. to 1600° F. If sufficient oxygen is not present in the process stream air may be introduced into the stream by means of line 32 to provide the required oxygen.

The stream of hot oxidized gases leaving the bed of oxidation catalyst units 18 at a maximum temperature which may be for example 1600° F. where a high temperature platinum catalyst is employed, then enters the checker-brickwork in the lower part of chamber 12, flows by means of the passage 15 into the checker-brickwork assembly in lower portion of chamber 13, through the assembly of units 18a in the upper portion of chamber 13 and thence to stack 34.

Because of the maximum temperature limit in the catalyst bed of approximately 1600° F. imposed by the inability of the oxidation catalyst to withstand higher temperatures, the carbonaceous particles suspended in the gas stream do not undergo complete oxidation in chamber 12 and a portion of these particles is carried into chamber 13. By means of the burners 25, the temperature of this stream is raised to a higher level (for example from 1600° F. up to 2000° F.) at which temperature the oxidation of the carbonaceous particles will proceed in a satisfactory manner. The checker-brickwork assembly in the lower portion of chamber 13 and the assembly of ceramic units 18a are heated to the temperature of the gas stream e.g. 2000° F. and further assist in promoting the oxidation and elimination of the suspended carbonaceous particles such that the flue gases leaving stack 34 are substantially free of such particles.

In the operation of the above process, it will be seen that, assuming a catalyst operating temperature of 1600° F., it is only necessary to add enough additional heat from outside sources to increase the gas temperature by 200° F.–600° F. in order to achieve an ultimate temperature of 1800° F. to 2200° F. at which virtually complete elimination of the carbonaceous solids occurs. If, on the other hand, the gas stream is heated from its initial temperature entirely by extraneously supplied heat to approximately 1400° F. at which it would burn by flame combustion, and assuming it was available from the process at the usual initial temperature levels of 300° F. to 500° F., it would be necessary to add sufficient outside heat to increase its temperature by 900° F. to 1100° F. resulting in the consumption of from two to four times as much extraneously supplied heat.

In some cases, where the temperature of the process stream 27 is relatively low, such as 100° F., it will be necessary to increase the temperature of this stream prior to entering the catalyst to e.g. 300° F. to 600° F. in order to avoid undue cooling of the catalyst by the entering stream which may prevent effective operation of the catalyst. This, of course, may be accomplished by adding heat to the stream from outside sources. However, in some cases it will prove advantageous to recirculate some of the hot stack gases leaving stack 34 at temperatures of e.g. 2000° F. and to mix these with the relatively cool stream of gases to be processed, as indicated by the dotted line 35. Indirect heat exchange between the gases in line 27 and line 34 may also be used to accomplish the same purpose.

In some cases, the gas stream to be processed will contain considerable amounts of combustible gases and/or the temperature of these gases will be relatively high. In some such cases it will be found that upon oxidation of the combustible components which the gas stream contains, the gas stream will undergo a temperature increase which will raise the temperature of the gas stream above the maximum operating temperature of the catalyst. Thus, for example, a gas stream entering the catalyst at 800° F. and containing 6% carbon monoxide and sufficient oxygen to provide that necessary for oxidation of the carbon monoxide will undergo a temperature increase upon oxidation of the carbon monoxide of approximately 1000° F., thus increasing the gas stream temperature to 1800° F. Since this temperature is in excess of that at which the catalyst will effectively operate, it is necessary to dilute the stream passing through the catalyst with sufficient inert gases, such as additional air, such that the ultimate temperature reached in the catalyst bed does not exceed its maximum operating temperature.

When handling this type of gas stream it will often prove most desirable to use a split stream operation, that is to by-pass a portion of the stream around the catalyst and mix it with the hot oxidized gases leaving the catalyst, while providing a temperature for the mixture at which the unoxidized portion will undergo oxidation out of contact with the catalyst and at which the entrained carbonaceous solids will also undergo substantially complete oxidation. To operate in this manner, the process stream 27 is split into two portions, one flowing by line 28 into top portion of chamber 12 and the other flowing by line 30 into the checker-brickwork assembly 17 in the bottom of chamber 12 and mixing with the hot oxidized gases leaving the catalyst. If necessary additional air may be introduced into the process stream to supply oxygen required for combustion by means of valved lines 32 and 33. The relatively cool gases introduced into the bottom of chamber 12 by line 30 mix in the checker-brickwork assembly with the hot oxidized gases from the bed of oxidation catalyst units 18. The mixture then flows by means of passage 15 into chamber 13. In passage 15 the temperature of the mixture is raised preferably to from 1800° F. to 2200° F. by means of burners 25. In this temperature range, the unoxidized portion of the process stream will undergo oxidation out of contact with the oxidation catalyst, such oxidation being promoted by contact with the ceramic surfaces in the checker-brickwork assembly in the lower portion of chamber 13 and by contact with the ceramic units 18a. At these temperatures also, the unoxidized solid carbonaceous particles will undergo oxidation so that the flue gas leaving by line 34 is substantially free from such particles.

Use of the split stream type of operation as described above has the advantages both of reducing the amount of oxidation catalyst required (since only a portion of the total stream is passed over the catalyst) and by further reducing the amount of outside heat it is necessary to employ to bring the final temperature of the mixture to the range of from 1800° F. to 2200° F. at which effective oxidation of the carbonaceous particles occurs. This having in outside heat results from the fact that less inert diluting gas is required for controlling maximum catalyst temperatures since it is not necessary to dilute that portion of the stream which by-passes the catalyst, the undiluted by-passed portion being oxidized at a higher temperature level out of contact with the catalyst. This reduction in the total amount of diluting gas required reduces the total volume of gas that must be raised to the ultimate temperature level, preferably from 1800° F. to 2200° F., at which effective oxidation of the carbonaceous particles takes place, and this of course in turn reduces the amount of outside heat that must be added by burners 25 or otherwise to produce such temperatures.

*Example I*

The following example illustrates the type of operation in which all of the gas stream to be treated is passed over oxidation catalyst to raise its temperature to approximately 1600° F. after which the stream is heated by extraneously supplied heat to 2000° F. to complete the oxidation of the entrained particles of carbonaceous material.

A gas stream is introduced into the top of chamber 12 through line 28 having the following composition and temperature after addition of air thereto through line 32:

| | |
|---|---:|
| $H_2$ _____percent__ | 4 |
| $CO$ _____do____ | 2.2 |
| $O_2$ _____do____ | 10 |
| $N_2$ _____do____ | 80 |
| $H_2O$ (vapor) _____do____ | 3.8 |
| Temperature _____° F__ | 600 |
| Approximate average specific heat__B.t.u./lb./° F__ | .24 |
| Approximate average weight per ft.³ _____lbs__ | .076 |
| Entrained carbon particles ____percent by weight__ | .2 |

Using catalytic units of the type illustrated with elements 22 provided with a .003″ film of activated alumina impregnated with approximately 1% by weight (based on the alumina film) of finely divided platinum, and using approximately 17 square inches of catalytic surface per cubic foot of gas treated per minute, substantially complete oxidation of the hydrogen and carbon monoxide contained in the above stream can be effected at temperatures up to about 1600° F. which represents the maximum temperature at which the catalyst will operate effectively over long periods of time.

The heat released in such a stream after complete oxidation of the hydrogen and carbon monoxide amounts approximately to 18.2 B.t.u./ft.³ which will raise the temperature of the gas stream and the catalyst bed by approximately 1000° F. (neglecting heat losses by conduction and radiation), giving a catalyst bed temperature at the exit side of the catalyst and a final gas exit temperature of approximately 1600° F.

During the catalytic oxidation of the combustible gases a portion of the carbon particles, particularly those of extremely small size, undergo oxidation, but the effluent from the catalyst at temperature of 1600° F. still contains objectionable quantities of the particles. The 1600° F. stream is then heated by burners 25 to 2000° F. and passed over additional checker-brickwork and the units 18a. At this temperature substantially complete oxidation of the remaining carbon particles is effected and the effluent from stack is substantially free of such particles.

In thus effecting substantially complete cleanup of the carbon particles by this method, it was necessary to use only sufficient extraneously supplied heat (from burners 25) to heat the stream from 1600° F. to 2000° F. or about 7.2 B.t.u./ft.³ of gas treated. If, on the other hand, the stream was heated by extraneous heat from 600° F. to approximately 1400° F. at which the mixture will burn by flame combustion, an expenditure of approximately 14.4 B.t.u./ft.³ or double the amount of extraneously supplied heat would be required.

Example II

This example illustrates the so-called split stream type of operation described above in which a portion of the gas stream to be treated is passed over oxidation catalyst to raise its temperature to approximately 1600° F., while another unoxidized portion is mixed with the hot oxidized effluent from the catalyst, after which the mixture is heated by extraneously supplied heat and heat released by oxidation of the unoxidized combustible gases in the portion which by-passes the catalyst to approximately 2000° F. at which the oxidation of the entrained particles of carbonaceous material is completed.

A gas stream is supplied through line 27 having the following composition and temperature:

| | |
|---|---|
| $H_2$ ___percent__ | 6.0 |
| CO ___do__ | 4.5 |
| $O_2$ ___do__ | 10.0 |
| $N_2$ ___do__ | 78.0 |
| $H_2O$ ___do__ | 3.5 |
| Approximate average specific heat _B.t.u./lb./° F__ | .24 |
| Approximate average weight per ft.³ ___lbs__ | .076 |
| Entrained carbon particles ___percent by weight__ | .1 |
| Temperature ___° F__ | 360 |

The chemical heat in such a stream amounts to approximately 31 B.t.u./ft.³ which is sufficient, when completely released by oxidation of the hydrogen and carbon monoxide, to raise the temperature of the stream by approximately 1700° F. or to a final temperature of 2060° F. Since such a temperature is in excess of the maximum operating temperature of the oxidation catalyst, sufficient diluting air is added to that portion of the stream which is passed over the catalyst so that the catalyst operating temperature will remain below the maximum level permissible.

Using catalytic units of the same type as in Example I, approximately 75% of the total process stream in line 27 having the above composition is passed by means of line 28 into the top of chamber 12. To control the catalyst temperature to a maximum of 1600° F., approximately .3 cu. ft. of air at a temperature of 100° F. is added by line 32 for each cubic foot of process gas introduced into the top of chamber 12. The addition of the air results in a mixture temperature for the gases entering chamber 12 of 300° F.

Approximately 25% of the process gas introduced by line 27 is conducted by means of line 30 and is introduced (after being preheated from its initial temperature of 360° F. to 600° F. by means not shown) into the checker-brickwork assembly at the bottom of chamber 12 where it mixes with the effluent gases from the catalyst at a temperature of 1600° F. to produce a mixture temperature in the bottom of chamber 12 of approximately 1400° F.

This mixture, containing entrained carbon particles and the combustible gases from that portion of the stream which by-passes the catalyst, then flows to chamber 13 and is heated by means of burners 25 to further raise its temperature. As this mixture is heated above 1400° F., the combustible gases which it contains will undergo spontaneous oxidation and the heat released will increase the temperature of the mixture by approximately 340° F., producing a mixture temperature of 1740° F. independently of the addition of the extraneously supplied heat by burners 25. The burners 25 must accordingly supply sufficient heat only to raise the mixture from 1740° F. to a final temperature of 2000° F. at which substantially the complete oxidation of the suspended particles occurs.

Operating according to the above system, the extraneously supplied heat from burners 25 or other sources necessary to raise the process stream from its initial temperature of 360° F. to 2000° F., including the heat required for preheating the by-passed portion from 360° F. up to 600° F. amounts to 6.7 B.t.u./ft.³ of process gas treated. In contrast, if all of the process gas of the above composition and temperature were passed through the catalyst together with sufficient diluting air at 100° F. to provide the necessary additional mass to control the catalyst temperature to a maximum of 1600° F., the total amount of extraneous heat required would amount to 9.4 B.t.u./ft.³ of process gas treated. In further contrast to the system employed in this example, if the process gas were heated by extraneously supplied heat from its initial temperature of 360° F. to approximately 1400° F. at which the combustible gases would burn by spontaneous flame combustion, the total amount of extraneously supplied heat to accomplish this would amount to 18.7 B.t.u./ft.³ of process gas treated, or approximately three times the amount required in the above system.

A further advantage of the above system is the fact that in contrast to passing all the stream through the catalyst less oxidation catalyst is required for treating the gas stream. In this example since 25% of the stream by-passes the catalyst, the amount of catalyst required is reduced by 25%.

It is apparent from the above that the present invention provides an economical and practical method for treating effluents containing suspended carbonaceous solids together with combustible gases in concentrations below flammability limits to the temperature at which effective oxidation of the suspended solids occurs. Other modifications of the invention not specifically mentioned above which will occur to those skilled in the art are intended to be included within the scope of the appended claims.

We claim:

1. A method for treating a gas stream containing suspended carbonaceous solids and combustible gases in substantial concentrations but less than those required to provide a mixture which is flammable at ordinary temperatures comprising the steps of catalytically oxidizing the combustible gases in said stream so as to thereby increase its temperature to the order of from 1200° F. to 1600° F. by contacting said stream with an oxidation catalyst, and thereafter heating said stream out of contact with said catalyst to a temperature of the order of 1800° F. to 2200° F. at which effective oxidation of said carbonaceous solids takes place in the presence of ceramic surfaces, and passing the thus heated stream into contact with extended ceramic surfaces so as thereby to effect substantially complete elimination of said carbonaceous solids.

2. A method in accordance with claim 1 in which said stream, after heating to temperatures of 1800° F. to 2200° F. is passed over heat exchange surfaces to recover heat therefrom.

3. A method for treating effluent gases from the production of carbon black containing suspended particles of carbon black and combustible gases in substantial concentrations but less than those required to provide a mixture which is flammable at ordinary temperatures comprising the steps of catalytically oxidizing the combustible gases in said stream so as to thereby increase its temperature to the order of 1200° F. to 1600° F. by contacting said stream with an oxidation catalyst and thereafter heating said stream out of contact with said catalyst to a temperature of the order of 1800° F. to 2200° F. at which effective oxidation of said suspended carbon black particles takes place in the presence of ceramic surfaces, and passing the thus heated stream into contact with extended ceramic surfaces so as thereby to effect substantially complete elimination of said carbonaceous solids.

4. A method for treating a gas stream containing suspended carbonaceous solids and combustible gases in substantial concentrations but less than those required to provide a mixture which is flammable at ordinary temperatures comprising the steps of diluting a portion of said stream with air, catalytically oxidizing the combustible gases in the diluted portion of said stream so as to thereby increase its temperature to the order of 1200° F. to 1600° F. by contacting said stream with an oxidation catalyst, mixing an undiluted and unoxidized portion of said stream with the hot oxidized off-gases from said oxidation catalyst, heating said mixture to the order of 1800° F. to 2200° F. to oxidize the unoxidized portion of the mixture out of contact with said oxidation catalyst with a corresponding release of heat and to oxidize the carbonaceous particles contained in said mixture.

5. A method in accordance with claim 4 in which the combined stream, after addition of said undiluted portion, is passed into contact with extended ceramic surface to aid in the oxidation of the combustibles contained in said undiluted portion.

References Cited in the file of this patent

UNITED STATES PATENTS

| | | |
|---|---|---|
| 943,599 | Hubbard | Dec. 4, 1909 |
| 1,985,713 | Bartlett | Dec. 25, 1934 |
| 2,013,699 | Richardson | Sept. 10, 1935 |
| 2,756,121 | Grimes | July 24, 1956 |

OTHER REFERENCES

Gas Engineers' Handbook, prepared by Gas Engineers' Handbook Committee of the Pacific Coast Gas Association, San Francisco, Calif. McGraw-Hill Book Co., Inc., N.Y., 1st ed., 1934, page 178.